(12) United States Patent
Ogasawara (10) Patent No.: US 6,535,271 B1
(45) Date of Patent: Mar. 18, 2003

(54) EXPOSURE APPARATUS

(75) Inventor: Mamoru Ogasawara, Ohmiya (JP)

(73) Assignee: Fuji Photo Optical Co., Ltd., Ohmiya (JP)

( * ) Notice: Subject to any disclaimer, the term of this patent is extended or adjusted under 35 U.S.C. 154(b) by 0 days.

(21) Appl. No.: 09/534,237

(22) Filed: Mar. 23, 2000

(30) Foreign Application Priority Data

Mar. 30, 1999 (JP) ............................................ 11-089371

(51) Int. Cl.[7] ........................... G03B 27/54; G03B 27/00
(52) U.S. Cl. ................................ 355/37; 355/1; 355/67; 358/901.1
(58) Field of Search .............................. 355/1, 37, 67, 355/70, 404; 358/509, 512, 513, 484, 901.1, 147

(56) References Cited

U.S. PATENT DOCUMENTS

| | | | | |
|---|---|---|---|---|
| 3,686,675 A | * | 8/1972 | Faul et al. .................... | 347/226 |
| 4,746,180 A | * | 5/1988 | Deisler et al. ............... | 358/147 |
| 4,866,593 A | * | 9/1989 | Miura et al. ................. | 347/241 |
| 4,871,228 A | * | 10/1989 | Roos .......................... | 385/116 |
| 4,884,095 A | * | 11/1989 | Yamanouchi et al. .......... | 355/1 |
| 4,975,729 A | * | 12/1990 | Gordon .......................... | 355/1 |
| 5,053,765 A | * | 10/1991 | Sonehara et al. ....... | 340/518.43 |
| 5,063,405 A | * | 11/1991 | Sakakibara .................. | 355/404 |
| 5,075,716 A | * | 12/1991 | Jehan et al. ..................... | 355/1 |
| 5,385,092 A | * | 1/1995 | Lewis et al. ................. | 101/467 |

FOREIGN PATENT DOCUMENTS

JP          2867936          12/1998

* cited by examiner

Primary Examiner—Russell Adams
Assistant Examiner—Rodney Fuller
(74) Attorney, Agent, or Firm—Clifford Chance Rogers & Wells LLP (57) ABSTRACT

An exposure apparatus comprises a light source section, which is constituted of a plurality of arrayed light source units, each of the light source units comprising multiple kinds of light emitting devices, which produce light beams having wavelengths falling within different wavelength ranges, and an optical system for combining the light beams, which have been radiated out from the multiple kinds of the light emitting devices, with one another to form a combined light beam, and converging the combined light beam onto one end of an optical fiber. An exposure head is located so as to stand facing a photosensitive surface of a photosensitive material capable of being conveyed. The other end of the optical fiber is connected to the exposure head. A driving mechanism moves the exposure head in a straight line along a direction, which is normal to the direction of conveyance of the photosensitive material.

3 Claims, 8 Drawing Sheets

EXPOSURE APPARATUS

BACKGROUND OF THE INVENTION

1. Field of the Invention

This invention relates to an exposure apparatus. This invention particularly relates to an exposure apparatus for recording an image, which is represented by a digital signal, on a photosensitive material.

2. Description of the Prior Art

Exposure apparatuses for recording an image, which is represented by a digital signal, on a photosensitive material, wherein a rotating member referred to as a rotating polygon mirror is utilized, have heretofore been known. The rotating polygon mirror is provided with plane reflecting surfaces at the periphery for reflecting light, which has been produced by a light emitting device, such as a laser or a light emitting diode (LED), onto a material to be scanned with the light.

Also, an image-wise exposure apparatus has heretofore been proposed, wherein image signals having been obtained by being divided into a plurality of optical wavelength regions are converted into optical signals of colors corresponding to the respective optical wavelength regions, and the optical signals are radiated from an exposure head through a SELFOC lens array (SELFOC lens; trade name) onto photographic paper. The image-wise exposure apparatus is disclosed in, for example, Japanese Patent No. 2867936. In the disclosed image-wise exposure apparatus, optical fibers are utilized for optical transmission.

However, the exposure apparatus in which the rotating polygon mirror is utilized has the problems in that the exposure unit itself is expensive, and high precision parts and high accuracy of assembling operations are required.

SUMMARY OF THE INVENTION

The primary object of the present invention is to provide an exposure apparatus, which has a simple structure and is capable of being produced at a low cost.

Another object of the present invention is to provide an exposure apparatus, the size of which is capable of being kept small.

The present invention provides a first exposure apparatus, comprising:

i) a light source section, which is constituted of a plurality of arrayed light source units, each of the light source units comprising:
   a) multiple kinds of light emitting devices, which produce light beams having wavelengths falling within different wavelength ranges, and
   b) an optical system for combining the light beams, which have been radiated out from the multiple kinds of the light emitting devices, with one another to form a combined light beam, and converging the combined light beam onto one end of an optical fiber, ii) an exposure head, which is located so as to stand facing a photosensitive surface of a photosensitive material capable of being conveyed, and to which the other end of the optical fiber is connected, and iii) a driving mechanism for moving the exposure head in a straight line along a direction, which is normal to the direction of conveyance of the photosensitive material.

In the first exposure apparatus in accordance with the present invention, the multiple kinds of the light emitting devices should preferably be constituted of light emitting diodes, which produce a red light beam, a green light beam, and a blue light beam respectively.

The present invention also provides a second exposure apparatus, comprising:

i) a light source for producing a light beam, ii) a light modulating section, which is constituted of a plurality of arrayed light modulating units, each of the light modulating units comprising:
   a) multiple kinds of filtering devices, which perform filtering operations on the light beam having been radiated out from the light source such that the filtering devices transmit light components of the light beam having wavelengths falling within different wavelength ranges, and each of which radiates the corresponding transmitted light component into one end of an optical fiber of an optical fiber group, and
   b) a plurality of light modulating devices, each of which modulates the light beam incident upon the corresponding one of the filtering devices, iii) an exposure head, which is located so as to stand facing a photosensitive surface of a photosensitive material capable of being conveyed, and to which the other end of each optical fiber of the optical fiber group is connected, and iv) a driving mechanism for moving the exposure head in a straight line along a direction, which is normal to the direction of conveyance of the photosensitive material.

In the second exposure apparatus in accordance with the present invention, the multiple kinds of the filtering devices should preferably be constituted of dichroic filters, which transmit a red light component, a green light component, and a blue light component respectively. Also, each of the light modulating devices should preferably be constituted of a liquid crystal device.

As described above, the first exposure apparatus in accordance with the present invention comprises the light source section constituted of the plurality of the arrayed light source units, each of which comprises the multiple kinds of the light emitting devices, such as three-color light emitting diodes (LED's). The first exposure apparatus in accordance with the present invention also comprises the exposure head, the driving mechanism for moving the exposure head in a straight line, and the optical fibers connected between the light source units and the exposure head. Therefore, with the first exposure apparatus in accordance with the present invention, the structure of the exposure apparatus can be kept simple, and the cost of the exposure apparatus can be kept low.

Also, as described above, the second exposure apparatus in accordance with the present invention comprises the light modulating section constituted of the plurality of the arrayed light modulating units, each of which comprises the multiple kinds of the filtering devices, such as dichroic filters. Each of the filtering devices transmits only the red light component, the green light component, or the blue light component, and filters out the other light components. Each of the light modulating units also comprises the plurality of the light modulating devices, such as the liquid crystal devices, each of which modulates the light beam incident upon the corresponding one of the filtering devices. The second exposure apparatus in accordance with the present invention also comprises the exposure head, the driving mechanism for moving the exposure head in a straight line, and the optical fiber groups connected between the light source and the exposure head. Therefore, with the second exposure apparatus in accordance with the present invention, as in the first exposure apparatus in accordance with the present invention, the structure of the exposure apparatus can be kept simple, and the cost of the exposure apparatus can be kept low.

Further, with the first and second exposure apparatuses in accordance with the present invention, the optical fibers, which can be bent freely, are employed as the light transmission paths. Therefore, the advantages can be obtained in that the size of the exposure apparatus can be kept small, and the light transmission paths are not affected adversely by dust, or the like.

DESCRIPTION OF THE PREFERRED EMBODIMENTS

The present invention will hereinbelow be described in further detail with reference to the accompanying drawings.

Figure 1:
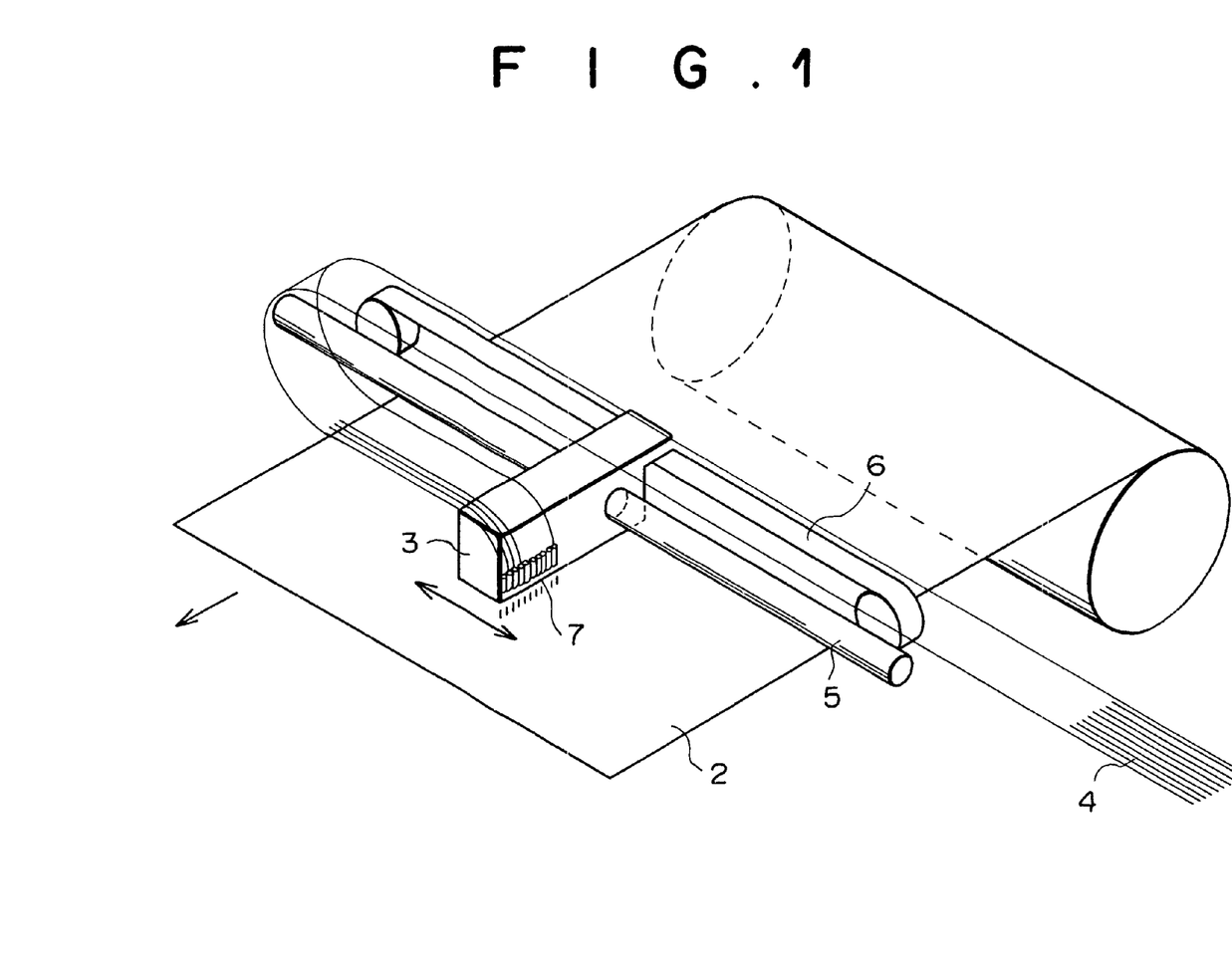
FIG. 1 is a perspective view showing an embodiment of the first exposure apparatus in accordance with the present invention, in which a light source section is not shown.
Figure 2:
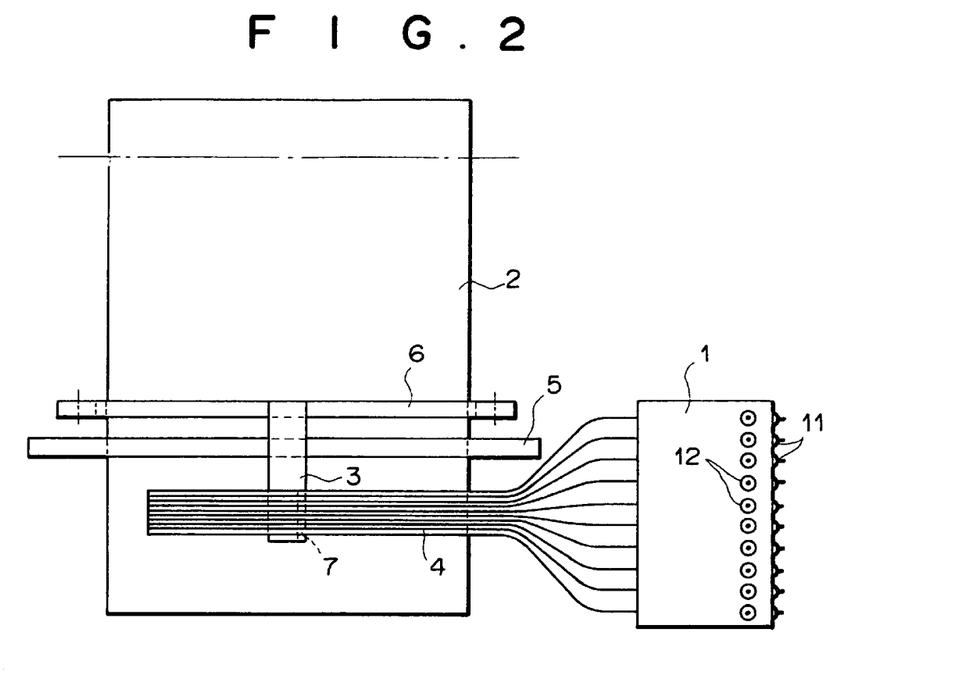
FIG. 2 is a plan view showing the embodiment of FIG. 1.
Figure 3:
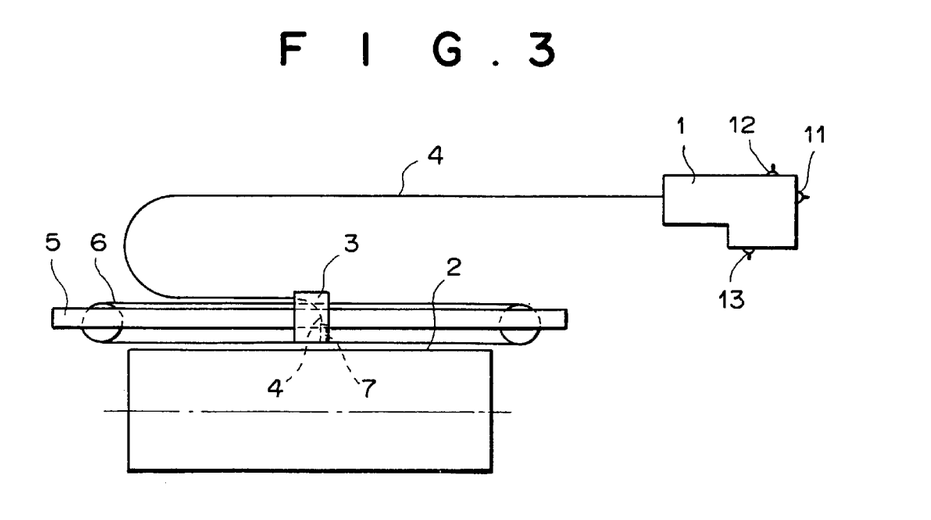
FIG. 3 is a front view of FIG. 2.
Figure 4:
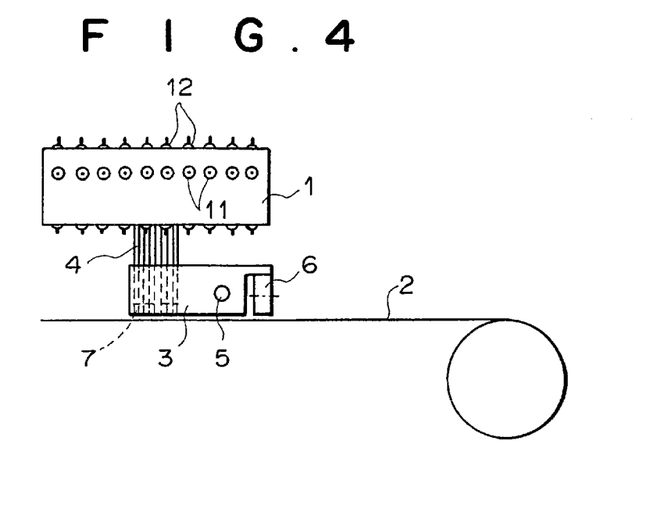
FIG. 4 is a side view of FIG. 2.
Figure 5:
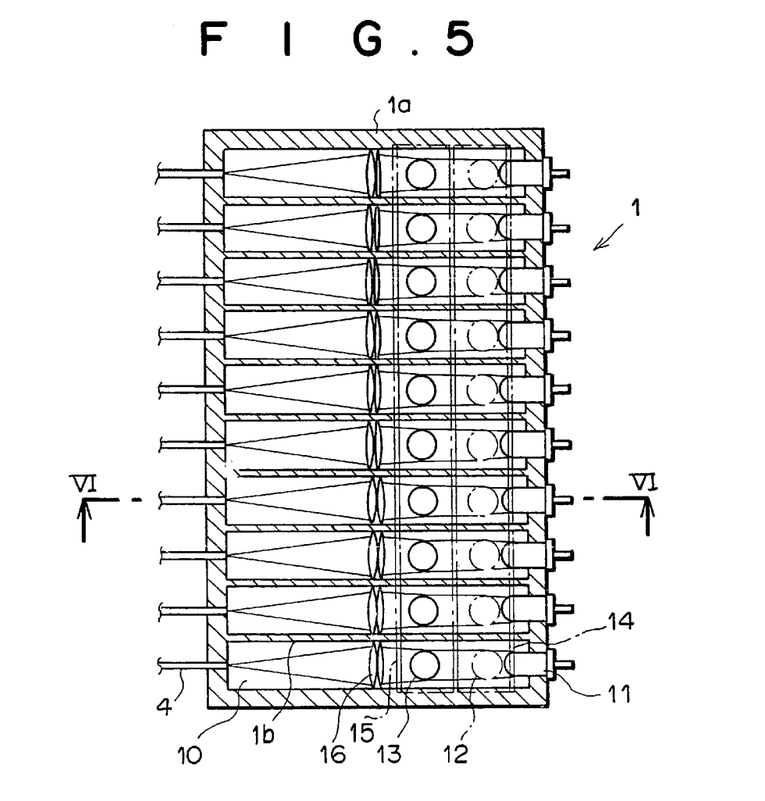
FIG. 5 is a sectional view taken on line V—V of FIG. 6 and showing a light source section.
Figure 6:
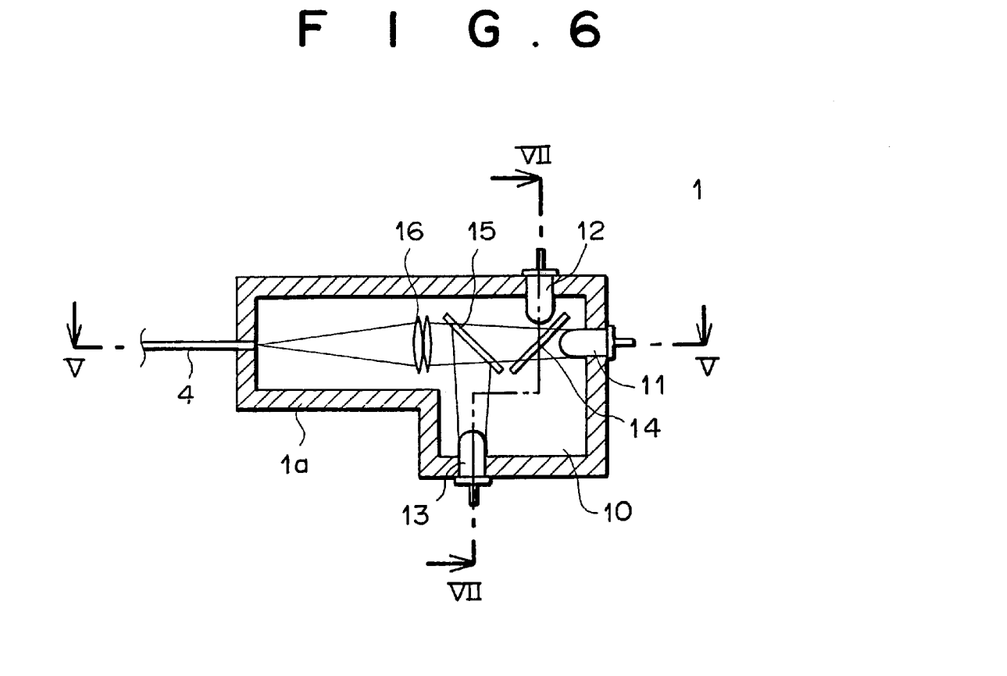
FIG. 6 is a sectional view taken on line VI—VI of FIG. 5.
Figure 7:
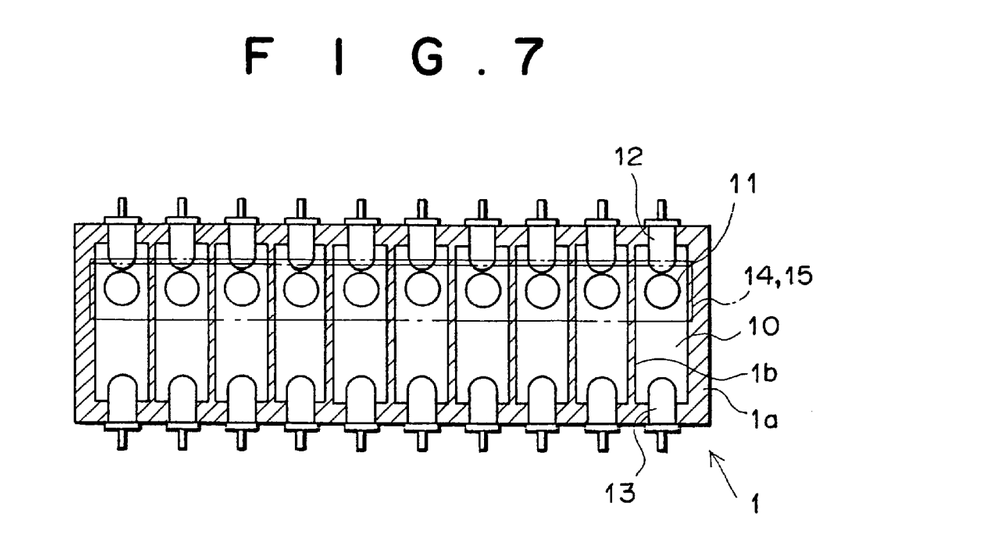
FIG. 7 is a sectional view taken on line VII—VII of FIG. 6.

An embodiment of the first exposure apparatus in accordance with the present invention will be described hereinbelow with reference to FIG. 1 through FIG. 7. FIG. 1 is a perspective view showing the embodiment of the first exposure apparatus in accordance with the present invention, in which a light source section is not shown. FIG. 2 is a plan view showing the embodiment of FIG. 1. FIG. 3 is a front view of FIG. 2. FIG. 4 is a side view of FIG. 2. FIG. 5 is a sectional view taken on line V—V of FIG. 6 and showing a light source section. FIG. 6 is a sectional view taken on line VI—VI of FIG. 5. FIG. 7 is a sectional view taken on line VII—VII of FIG. 6.

As illustrated in FIG. 5, FIG. 6, and FIG. 7, the exposure apparatus comprises a light source section 1, which is constituted of a case housing 1a and a plurality of (in this embodiment, ten) light source units 10, 10, . . . arrayed in the case housing 1a. The light source units 10, 10, . . . are optically isolated from one another by partitions 1b, 1b, . . . The exposure apparatus also comprises an exposure head 3, which is located close to a photosensitive surface of a photographic paper (photosensitive material) 2 so as to stand facing the photosensitive surface. Each of the light source units 10, 10, . . . is connected to the exposure head 3 by an optical fiber 4, which is bent in a U-shaped form.

As illustrated in FIG. 1, FIG. 2, FIG. 3, and FIG. 4, a guide rod 5 is located above the photographic paper 2. The guide rod 5 extends in the direction (the main scanning direction), which is normal to the direction of conveyance of the photographic paper 2 (the sub-scanning direction). The exposure head 3 is fitted for sliding movement to the guide rod 5. Also, the exposure head 3 is engaged with a toothed endless belt 6, which is positioned in parallel with the guide rod 5. When the toothed endless belt 6 is driven by a pulse motor (not shown), the exposure head 3 is driven for reciprocating motion in the main scanning direction and along the photosensitive surface of the photographic paper 2.

As illustrated in FIG. 6, each of the ten light source units 10, 10, . . . comprises a light emitting diode (hereinbelow referred to as the B-LED) 11 for producing a blue light beam and radiating it toward the left in FIG. 6, a light emitting diode (hereinbelow referred to as the G-LED) 12 for producing a green light beam and radiating it downwardly in FIG. 6, and a light emitting diode (hereinbelow referred to as the R-LED 13 for producing a red light beam and radiating it upwardly in FIG. 6. Dichroic mirrors 14 and 15 are located on the downstream side with respect to the direction of travel of the blue light beam having been radiated out of the B-LED 11. The dichroic mirror 14 transmits the blue light beam, which has been radiated out of the B-LED 11, and reflects the green light beam, which has been radiated out of the G-LED 12. The dichroic mirror 15 transmits the blue light beam, which has been radiated out of the B-LED 11, and the green light beam, which has been radiated out of the G-LED 12, and reflects the red light beam, which has been radiated out of the R-LED 13. Also, a converging lens set 16 is located on the side downstream from the dichroic mirror 15. The converging lens set 16 converges a combined light beam coming from the dichroic mirror 15. Further, one end of the optical fiber 4 is located at the position, to which the combined light beam is converged by the converging lens set 16. The one end of the optical fiber 4 is secured to the case housing 1a of the light source section 1.

The intensity of the light beam produced by each of the B-LED 11, G-LED 12, and the R-LED 13 is modulated by modulation means (not shown) and in accordance with an image signal. The optical axes of the thus modulated three-color light beams are caused to coincide with one another by the dichroic mirror 14 and the dichroic mirror 15, and the modulated three-color light beams are thereby combined together to form the combined light beam. The combined light beam is converged by the converging lens set 16 onto the one end of the optical fiber 4 and transmitted to the exposure head 3.

As the optical fibers 4, 4, . . . , core-clad types of optical fibers should preferably be employed such that no cross talk may occur between the adjacent optical fibers 4, 4. When necessary, such that no cross talk may occur, the optical fibers 4, 4, . . . may be located at a spacing from one another, and exposure may be performed discretely.

The other ends of the ten optical fibers 4, 4, . . . are aligned in a row along the sub-scanning direction (i.e., the direction of conveyance of the photographic paper 2) and are secured in this form to the exposure head 3. The exposure head 3 constitutes an integral unit comprising a lens system 7, such as a SELFOC lens array (SELFOC lens; trade name), for forming images of the light beams, which are radiated out from the ends of the respective optical fibers 4, 4, ..., on the photosensitive surface of the photographic paper 2. When necessary, the lens system 7 may be combined with mirrors and prisms. Also, when necessary, the exposure head 3 may be provided with a sensor for detecting a writing start end, and a grid for position detection.

With the constitution described above, a single optical fiber 4 is utilized with respect to one pixel, and the light beams having been radiated out from the ends of the optical fibers 4, 4, ... are irradiated via the lens system 7 onto the photosensitive surface of the photographic paper 2, which is being kept stationary. With a single scanning of the exposure head 3 along the main scanning direction, image areas corresponding to ten lines are recorded on the photosensitive surface of the photographic paper 2. Also, after the single scanning along the main scanning direction is finished, the photographic paper 2 is conveyed by a predetermined distance corresponding to the effective width of the exposure head 3 with respect to the sub-scanning direction, and the next scanning along the main scanning direction is performed.

As described above, this embodiment comprises the light source section 1 provided with ten arrayed light source units 10, 10, ..., each of which is provided with one set of the B-LED 11, the G-LED 12, and the R-LED 13 for producing the R, G, and B three-color light beams. The embodiment also comprises the exposure head 3 for moving in a straight line, the driving mechanism for driving the exposure head 3, and the optical fibers 4, 4, ... connected between the exposure head 3 and the respective light source units 10, 10, .... Therefore, with this embodiment, the structure of the exposure apparatus can be kept simple, and the cost of the exposure apparatus can be kept low.

Also, with the embodiment described above, in which the optical fibers 4, 4, ... are bent in the U-shaped form, the advantages can be obtained in that the height of the exposure apparatus can be kept small, and the light transmission paths are not affected adversely by dust, or the like.

Figure 8:
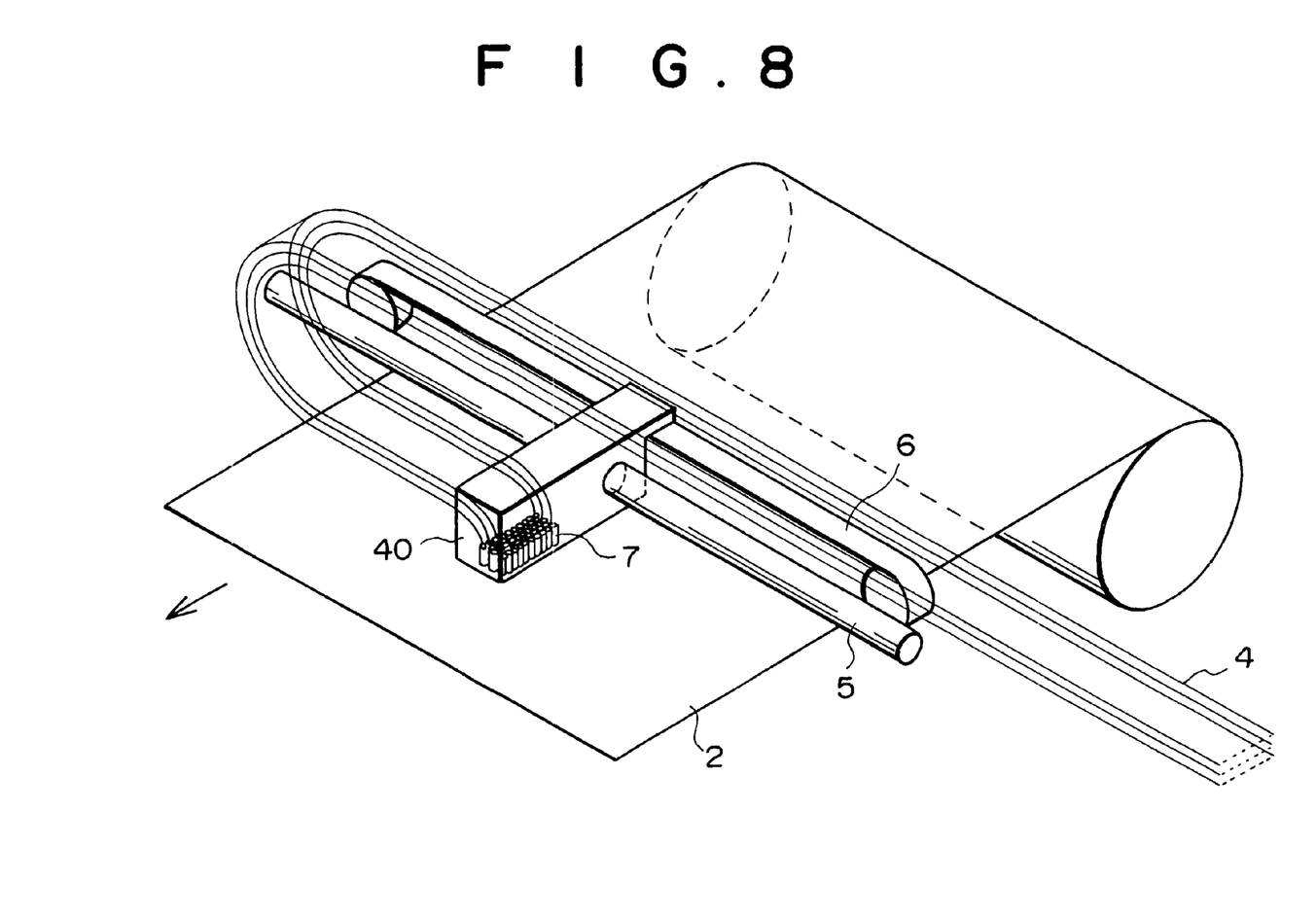
FIG. 8 is a perspective view showing an embodiment of the second exposure apparatus in accordance with the present invention, in which a light source section and a light modulating section are not shown.
Figure 9:
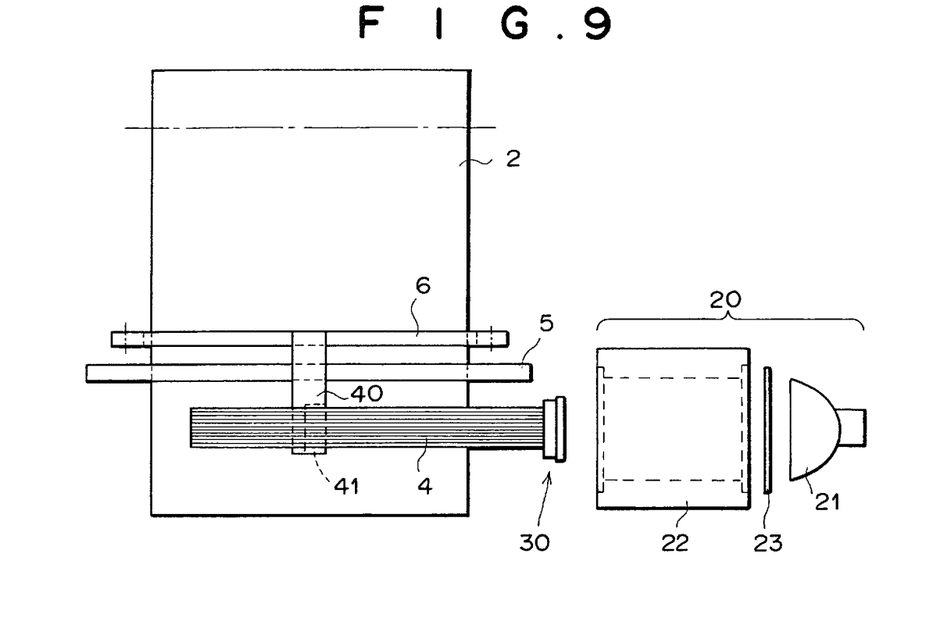
FIG. 9 is a plan view showing the embodiment of FIG. 8.
Figure 10:
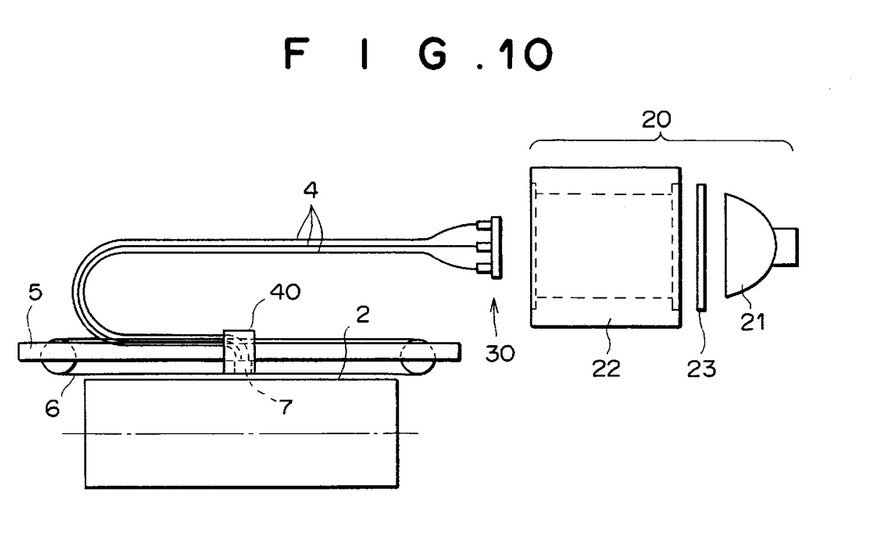
FIG. 10 is a front view of FIG. 9.
Figure 11:
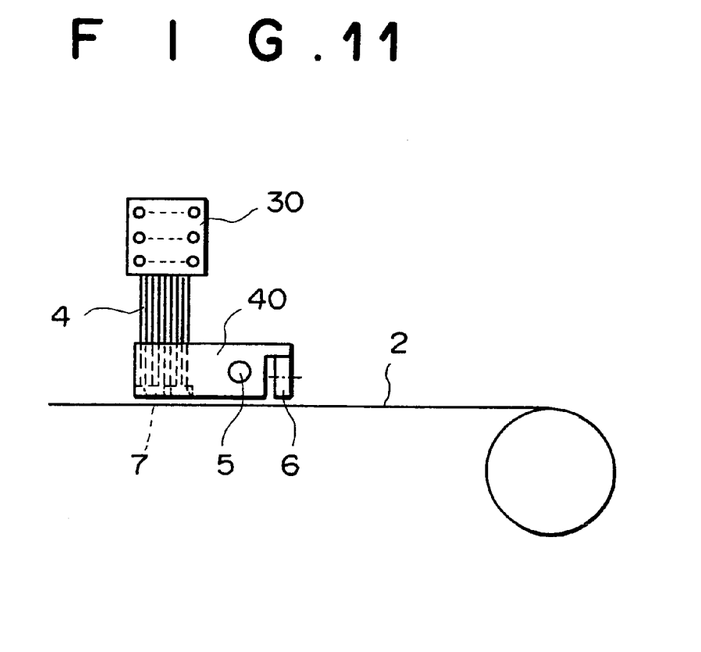
FIG. 11 is a side view of FIG. 9, in which the light source section is not shown.
Figure 12:
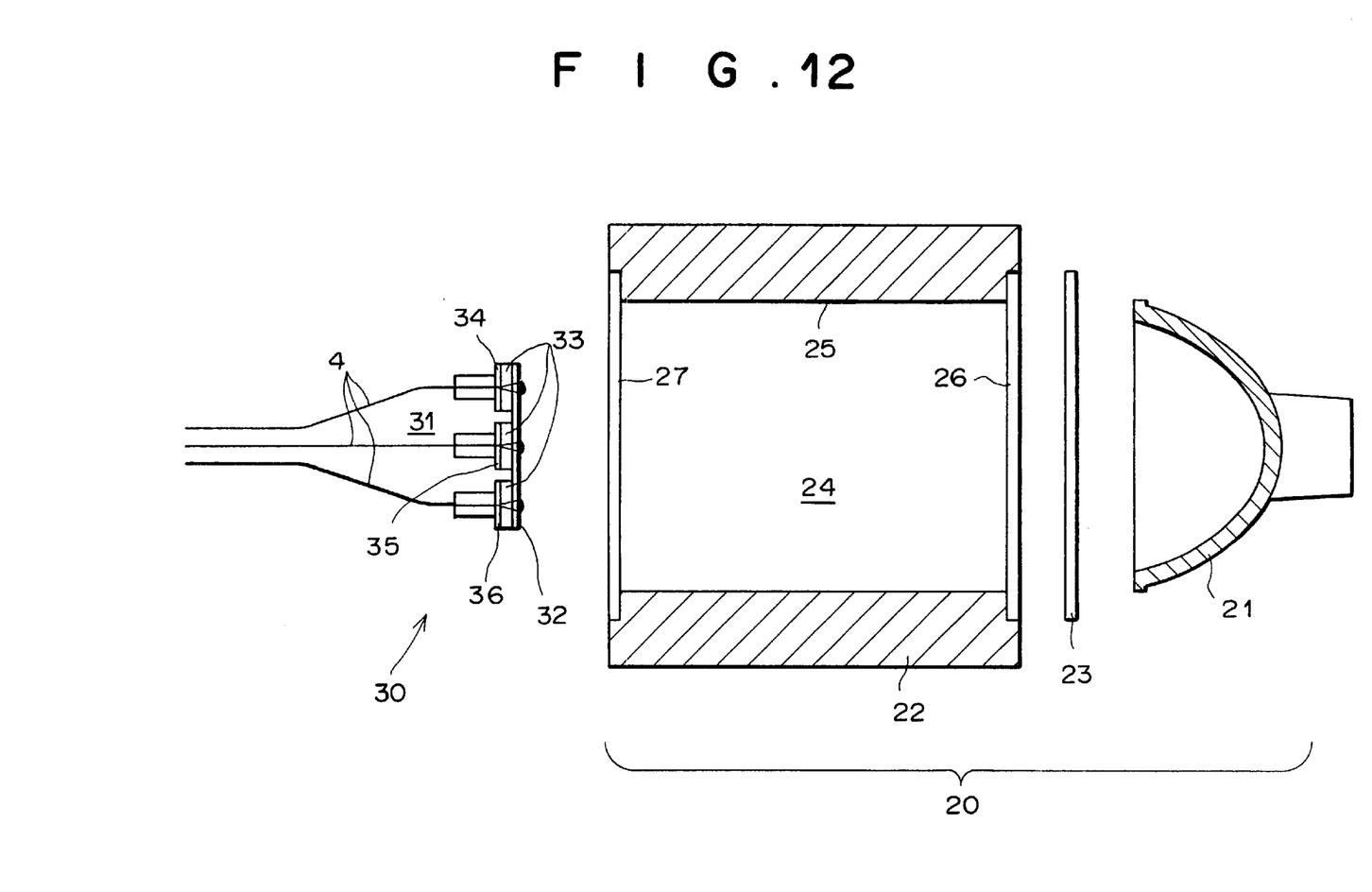
FIG. 12 is an enlarged front view showing the light source section and a light modulating section in the embodiment of the second exposure apparatus in accordance with the present invention.

An embodiment of the second exposure apparatus in accordance with the present invention will be described hereinbelow with reference to FIG. 8, FIG. 9, FIG. 10, FIG. 11, and FIG. 12. FIG. 8 is a perspective view showing the embodiment of the second exposure apparatus in accordance with the present invention, in which a light source section and a light modulating section are not shown. FIG. 9 is a plan view showing the embodiment of FIG. 8. FIG. 10 is a front view of FIG. 9. FIG. 11 is a side view of FIG. 9, in which the light source section is not shown. FIG. 12 is an enlarged front view showing the light source section and the light modulating section in the embodiment of the second exposure apparatus in accordance with the present invention.

As illustrated in FIG. 12, the exposure apparatus comprises a light source lamp 21 for producing a white light beam, and a mirror box 22 located in front of the light source lamp 21 in order to uniformize the intensity of the white light beam having been radiated out from the light source lamp 21. The exposure apparatus also comprises an infrared ray blocking filter 23 intervening between the light source lamp 21 and the mirror box 22. The mirror box 22 has a chamber 24 through which the white light beam having been radiated out from the light source lamp 21 passes. Inner wall surfaces 25, 25, ... of the chamber 24 are formed as mirror surfaces. Also, light diffusing plates 26 and 27 are located at the inlet and the outlet of the chamber 24 respectively.

A light modulating section 30 is located in front of the mirror box 22. The light modulating section 30 comprises a plurality of (e.g., ten pieces of, i.e. ten channels of) light modulating units 31, 31, ... arrayed so as to stand side by side with one another. Each of the light modulating units 31, 31, ... comprises a converging lens 32 for converging the incident light, and three liquid crystal devices 33, 33, 33, which act as light modulating devices. The transmittance of each of the liquid crystal devices 33, 33, 33 changes in accordance with an applied image signal. Each of the light modulating units 31, 31, ... also comprises dichroic filters 34, 35, and 36, which perform filtering operations on the white light beams radiated out from the liquid crystal devices 33, 33, 33 and convert the white light beams into a red light beam, green light beam, and a blue light beam respectively.

One end of the optical fiber 4 is secured to the side downstream from each of the dichroic filters 34, 35, and 36. The R (red), G (green), and B (blue) modulated light beams, which have been radiated out from the dichroic filters 34, 35, and 36 respectively, are transmitted through the corresponding optical fibers 4, 4, 4, which are bent in the U-shaped form to an exposure head 40.

As in the aforesaid embodiment of the first exposure apparatus in accordance with the present invention, as illustrated in FIG. 8, FIG. 9, FIG. 10, and FIG. 11, the guide rod 5 is located above the photographic paper 2. The guide rod 5 extends in the direction (the main scanning direction), which is normal to the direction of conveyance of the photographic paper 2 (the sub-scanning direction). The exposure head 40 is fitted for sliding movement to the guide rod 5. Also, the exposure head 40 is engaged with a toothed endless belt 6, which is positioned in parallel with the guide rod 5. When the toothed endless belt 6 is driven by a pulse motor (not shown), the exposure head 40 is driven for reciprocating motion in the main scanning direction and along the photosensitive surface of the photographic paper 2.

As described above, three optical fibers 4, 4, 4 are utilized for each channel, and a total of 30 optical fiber 4, 4, 4 are utilized for a total of ten channels. The other ends of the 30 optical fibers 4, 4, ... are aligned to form an optical fiber array (which is composed of three optical fibers along the main scanning direction×ten optical fibers along the sub-scanning direction). The other ends of the 30 optical fibers 4, 4, ... are secured in this array form to the exposure head 3. The exposure head 40 constitutes an integral unit comprising the lens system 7, such as a SELFOC lens array (SELFOC lens; trade name), for forming images of the light beams, which are radiated out from the ends of the respective optical fibers 4, 4, ..., on the photosensitive surface of the photographic paper 2. When necessary, the lens system 7 may be combined with mirrors and prisms.

With the constitution described above, three optical fibers 4, 4, 4 are utilized with respect to one pixel, and the light beams having been radiated out from the ends of the optical fibers 4, 4, ... are irradiated via the lens system 7 onto the photosensitive surface of the photographic paper 2, which is being kept stationary. A single scanning of the exposure head 40 along the main scanning direction is performed while triple exposures to the R, G, and B light beams are performed. With the single scanning of the exposure head 40 along the main scanning direction, image areas corresponding to ten lines are recorded on the photosensitive surface of the photographic paper 2. Also, after the single scanning along the main scanning direction is finished, the photographic paper 2 is conveyed by a predetermined distance corresponding to the effective width of the exposure head 40 with respect to the sub-scanning direction, and the next scanning along the main scanning direction is performed.

With this embodiment of the second exposure apparatus in accordance with the present invention, the same effects as those with the aforesaid embodiment of the first exposure apparatus in accordance with the present invention can be obtained.

What is claimed is:

1. An exposure apparatus, comprising:

i) a light source for producing a light beam, ii) a light modulating section, which is constituted of a plurality of arrayed light modulating units, each of the light modulating units comprising:

a) multiple kinds of filtering devices, which perform filtering operations on the light beam having been radiated out from the light source such that the filtering devices transmit light components of the light beam having wavelengths falling within different wavelength ranges, and each of which radiates the corresponding transmitted light component into end of an optical fiber of an optical fiber group, and b) a plurality of light modulating devices, each of which modulates the light beam incident upon the corresponding one of the filtering devices, iii) an exposure head, which is located so as to stand facing a photosensitive surface of a photosensitive material capable of being conveyed, and to which the other end of each optical fiber of the optical fiber group is connected, and iv) a driving mechanism for moving the exposure head in a straight line along a direction, which is normal to the direction of conveyance of the photosensitive material.

2. An apparatus as defined in claim 1 wherein the multiple kinds of the filtering devices are constituted of dichroic filters, which transmit a red light component, a green light component, and a blue light component respectively.

3. An apparatus as defined in claim 1 or 2 wherein each of the light modulating devices is constituted of a liquid crystal device.

\* \* \* \* \*